06. COMPOSITIONS, COATING OR PLASTIC.

Cross Reference

UNITED STATES PATENT OFFICE.

262,603

JOHN W. McKNIGHT, OF WASHINGTON, DISTRICT OF COLUMBIA.

MANUFACTURE OF ARTIFICIAL MARBLE, STONE, AND TILE.

SPECIFICATION forming part of Letters Patent No. 262,603, dated August 15, 1882.

Application filed December 23, 1881. (No specimens.)

*To all whom it may concern:*

Be it known that I, JOHN WESLEY MC-KNIGHT, of Washington, in the District of Columbia, have invented certain new and useful Improvements in the Manufacture of Artificial Marble, Stone, and Tile; and I do hereby declare that the following is a full, clear, and exact description thereof.

This invention relates to certain improvements in the manufacture of artificial marble, stone, and tiles; and it has for its objects to provide a compound which may be employed in connection with Keen's or other hydraulic cement to form a mastic, which, when set and hardened, will form a material which will possess all the qualities of natural stone, and which may be employed for paving, architectural, or cemetery purposes, or which may be used as a grinding or abrasive or polishing material in the same manner as the natural stones employed for the purpose, as more fully hereinafter specified.

It is a well-known fact that almost every substance, simple or compound, capable of existing in the solid state assumes, under favorable circumstances, a distinct geometrical form or figure, usually bounded by plane surfaces and having angles of fixed and constant value. The faculty of crystallization seems to be denied only to a few bodies, chiefly complex organic principles, which, when in the solid state, are frequently characterized by a kind of beady or globular appearance, indicating that they are on the very verge of crystallization.

In my experiments in the manufacture of artificial stone I have dicovered that by employing different crystallizable substances properly mixed in solution a compound may be formed the crystals of which, during the process of crystallization, will interlock and bind the resultant mass and form a material, especially when combined with a suitable hydraulic cement, that can with difficulty be disintegrated.

In carrying out my invention I employ the following ingredients, in about the proportions named, viz: salt of sorrel or binoxalate of potassa, one pound; saltpeter dissolved in water, ten pounds; iodine dissolved in alcohol, one ounce; black-lead, two pounds; copperas, two pounds; zinc salts, two pounds; caustic potash, two and three-fourths pounds; carbonate of soda or potash, three pounds; litharge, one pound; steatite, twenty pounds; extract of hemlock or other astringent bark; chloride of lime, one pound. The soluble ingredients above mentioned are dissolved in their proper solvents and mixed, after which the insoluble ingredients in the state of impalpable powder are added and the whole thoroughly commingled, forming a compound which is mixed with one hundred gallons of water, more or less, and is ready for use in the manner and for the purposes as will hereinafter appear.

For the formation of slabs or tiles of the artificial stone I take one part of Portland or other cement, more or less, and twelve parts of pure silicious sand, and add the above-mentioned compound to the same to such an extent as to form a semi-plastic mass, and mix until each particle of sand is thoroughly coated with the plastic or semi-plastic material. I then place the mass in a suitable mold and allow it to set and harden, after which it may be polished on its face in the usual manner.

For the purpose of forming designs upon the face of the blocks I employ stencil-molds having suitable designs cut in them. These I apply to the face of a sheet of glass or other smooth surface which is to form the bottom of the mold in which the slab is to be cast. I then fill in the spaces with the compound and cement suitably colored, and when set, but before fully hardened, remove the stencil-mold, place the sides of the mold upon the glass, and fill in with the material to form the body of the block or slab, tamping, as usual, to solidify the mass, the material of the body uniting with the molded design and forming a solid homogeneous block. This will produce letters or designs flush with the face of the block; but if the plates are left in the mold and the body of the block cast in the mold and allowed to set before removing the plate the designs or letters will be formed in relief.

It is evident that designs or letters may be formed in relief on walls or other architectural surfaces by building up the same in the stencil-mold on the structure and allowing it to set or harden.

To imitate different kinds of marble or conglomerate, I mix the above-mentioned solution with cement and suitable colors and allow it to harden. I then grate the same into a powder, more or less fine according to the surface to be imitated, and sprinkle the differently-colored powders in proper proportions through a sieve upon a surface of glass or other smooth material, and then form the compound block thereon, as before mentioned, the bottom of the block when removed retaining the powdered material, and when suitably polished forming the top of the finished block.

In the manufacture of grindstones or polishing-wheels I mix oxide of iron or other suitable material with the compound and cement, and thus secure a stone equal to the natural for grinding, sharpening, or polishing razors or other edged tools.

The chloride of lime forming a component part of the solution renders the same peculiarly applicable to the purpose of securing different blocks together. The said blocks are naturally absorbent to a certain extent, creating a certain "suction" when the compound is applied as a mortar or cement, filling the pores of the block, uniting them firmly, and rendering the joints practically impervious to salt or fresh water and impenetrable under ordinary atmospheric influences.

Articles may be constructed of the compound in hollow sections, which, being extremely light, can be transported at much less cost than when solid, and at the same time possess the same or greater strength than if made solid; and the sections may be united, as desired, by my solution, so as to form a solid homogeneous block or compact mass.

The solution or compound, either alone or mixed to a proper consistency with cement, may be applied to the surfaces of absorbent building materials, either wood or stone, and by filling the pores will render such material impervious to moisture, while at the same time it will impart a glazed and highly-finished surface to the material, and will render the material substantially fire-proof. Hence any ordinary building can be decorated to imitate marble, granite, sand, Brunswick, or other stone at a comparatively small cost. When thus coated the use of paint may be dispensed with, as the absorbent qualities of the material, by capillary attraction or "suction," take up the compound, and by it become protected from the ordinary atmospheric influences, and when thus coated the outer portions of a building are well prepared to withstand the disintegrating "tooth of time."

The solution or compound is especially useful in the west and northwest sections of this country for repairing dilapidated buildings which have had the mortar driven out from between the joints of the bricks or stones by northeast storms, the building which would otherwise be comparatively useless being easily rendered habitable, impervious to moisture, and cool in the summer and warm in winter.

Adobe buildings can be coated and decorated by my process so that they may be rendered as durable as the natural stone.

My improved compound with the cement forms an admirable material for safes, prison-cells, sewer-pipes, flumes, raceways, monuments, paving-blocks, curbstones, street-crossings, cisterns, well-curbs, architectural and all other purposes to which the natural stone is adapted.

Having thus described my invention, what I claim, and desire to secure by Letters Patent, is—

1. The herein-described solution or compound, consisting of salt of sorrel, saltpeter, iodine, black-lead, copperas, zinc salts, caustic potash, carbonate of soda, litharge, steatite, extract of hemlock, and chloride of lime, to be employed with hydraulic cement or other desirable or suitable material for the manufacture of artificial stone or marble, as set forth.

2. The method herein described of forming designs in relief upon artificial stone or marble slabs, blocks, or walls by building up or molding the design of the compound described, colored or not, and suitably thickened with cement or other material.

3. The method herein described of forming designs or letters in relief on artificial stone or marble slabs or blocks, the same consisting in placing in the mold a stencil-mold having the designs or letters cut therein, filling said designs or letters with the compound suitably colored, then backing or filling up the mold with the artificial stone or marble compound, allowing it to set, and then taking the same from the mold and removing the stencil-mold, as set forth.

4. The method herein described of forming surface designs upon blocks or slabs of artificial marble or stone and upon artificial stone walls or other surfaces by building up such designs upon such surfaces in plain or artistic colors and plastering the remaining portions flush with the designs, substantially as specified.

5. The method herein described of forming variegated surfaces upon blocks or slabs of artificial marble or stone by grating the hereinbefore-mentioned compound, suitably colored and hardened, and sifting the same upon a surface of glass or other smooth material, and forming the body upon the sifted material, substantially as specified.

6. As a means of ornamenting and protecting walls and surfaces of buildings or building material, the compound herein described, mixed or not with hydraulic cement, and applied substantially in the manner described.

7. The improved artificial grinding or polishing material herein described, consisting of the compound named and abrasive or polishing substances mixed, and molded as set forth.

In testimony whereof I affix my signature, in presence of two witnesses, this 23d day of December, 1881.

J. W. McKNIGHT.

Witnesses:
C. A. NEALE,
CHAS. L. COOMBS.